Dec. 13, 1949     R. H. DIRCKX     2,491,164
EDUCATIONAL DEVICE

Filed Aug. 17, 1948     3 Sheets-Sheet 1

Rudolph H. Dirckx, INVENTOR.
BY Dybvig & Dybvig,
His Attorneys.

Dec. 13, 1949      R. H. DIRCKX      2,491,164
EDUCATIONAL DEVICE

Filed Aug. 17, 1948      3 Sheets-Sheet 2

Rudolph H. Dirckx, INVENTOR.
BY Dybvig & Dybvig,
his Attorneys.

Dec. 13, 1949   R. H. DIRCKX   2,491,164
EDUCATIONAL DEVICE
Filed Aug. 17, 1948   3 Sheets-Sheet 3

INVENTOR.
Rudolph H. Dirckx.
BY Dybvig & Dybvig.
His Attorneys.

Patented Dec. 13, 1949

2,491,164

UNITED STATES PATENT OFFICE 2,491,164

EDUCATIONAL DEVICE

Rudolph H. Dirckx, Dayton, Ohio

Application August 17, 1948, Serial No. 44,715

3 Claims. (Cl. 35—28)

This invention relates to an educational device and more particularly to a device for use in teaching children and others such subjects as spelling and arithmetic.

It is an object of this invention to provide a device in which any one of several different pictures or subjects may be interchangeably formed by selectively folding over suitably designated marginal segments or tabs which project from a suitable support.

Another object of this invention is to provide a device in which various types of mathematical problems and answers may be illustrated in an interesting manner.

Another object of this invention is to provide a novel device which may be used to entertain as well as to teach.

Another object of this invention is to provide an educational device in which one is taught to appreciate the distinction between different types of lettering as well as different pictures and colors.

Other objects and advantages reside in the construction of parts, the combination thereof and the mode of operation, as will become more apparent from the following description.

Figure 1:
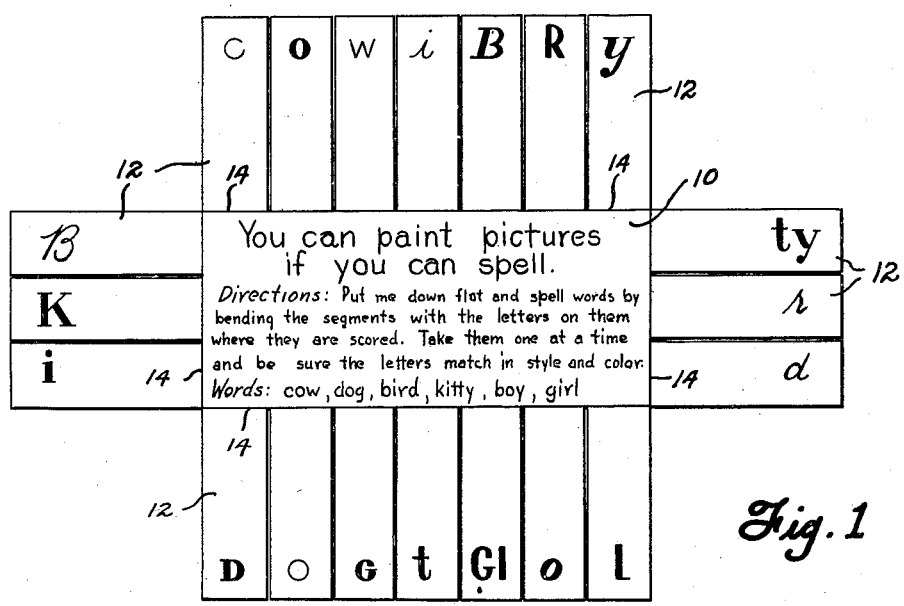
Figure 1 is a plan view of a device incorporating my invention.
Figure 2:
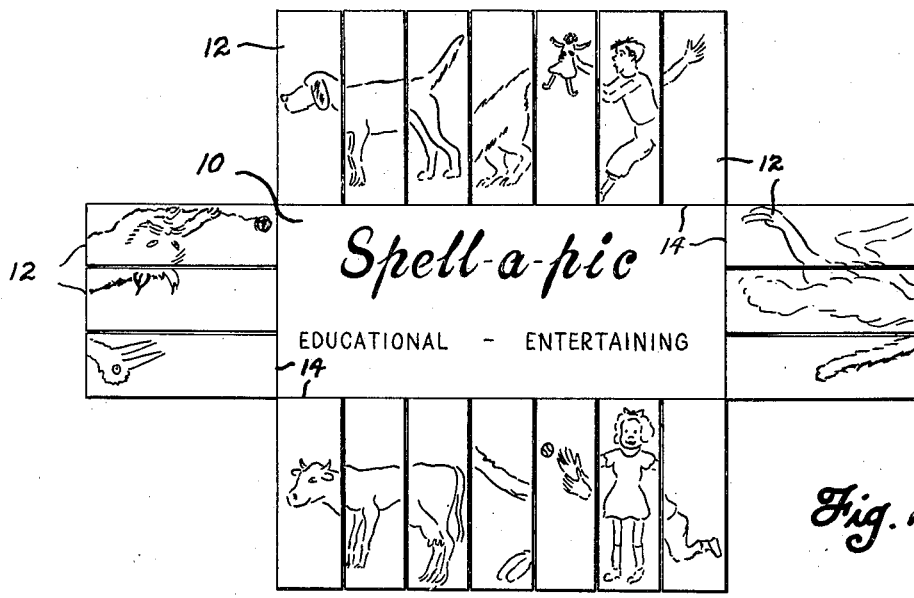
Figure 2 is a plan view showing the reverse side of the device shown in Figure 1.

Referring now to the drawings wherein I have shown preferred embodiments of my invention, reference numeral 10 designates a sheet of paper, cardboard, or the like, which has a series of marginal segments or tabs generally designated by the reference numeral 12 arranged as shown. For purposes of illustrating a very practical arrangement using my invention, the tabs 12 have been shown as formed integral with the main body 10, whereas these tabs may be formed separate and suitably hinged to the number 10 so as to be capable of being folded over onto the number 10.

Figure 3:
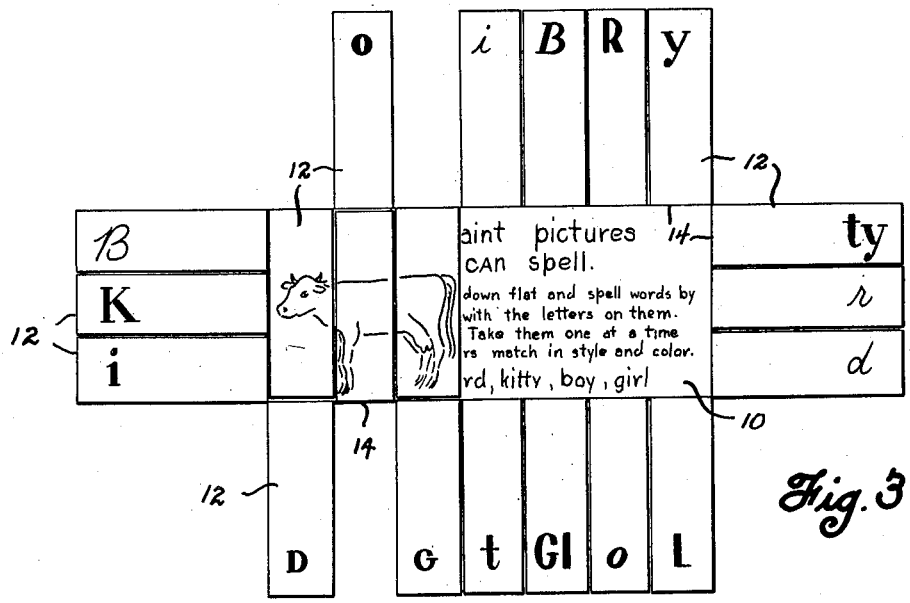
Figure 3 is a plan view showing the marginal segments or tabs bearing the letters "C," "O" and "W" folded over so as to form a picture of a cow.

In the arrangement shown in Figures 1 through 4, each tab 12 is provided on its front face with one or more letters of the alphabet which are printed in various styles of letters, as shown, and on the opposite side of each of the tabs there is provided a fragment of a picture of an object such as a cat, cow, dog, bird, or the like. The arrangement of the fragmentary pictures appearing on the backs of the segments is such that if the segments bearing the similar styled letters "C," "O" and "W," for example, are folded over onto the face of the main body or support 10, a composite picture of a cow will be formed from the fragmentary pictures, as illustrated in Figure 3 of the drawings.

In the preferred arrangement, the letters which are to be matched together in the spelling of one of the objects pictured on the reverse thereof are all made similar both as to the style of type and as to color. By using a different color and style of type for each word to be spelled, some of the letters of the alphabet may appear on more than one of the tabs, but if it does, it is printed in a manner distinctively different in each instance. Thus, the letters forming the word "cow" may be made in the form of rather light weight letters, whereas the letters used in spelling the word "dog" are made in the form of rather heavy letters and the letters used to designate "bird" are made in the form of script.

Figure 4:
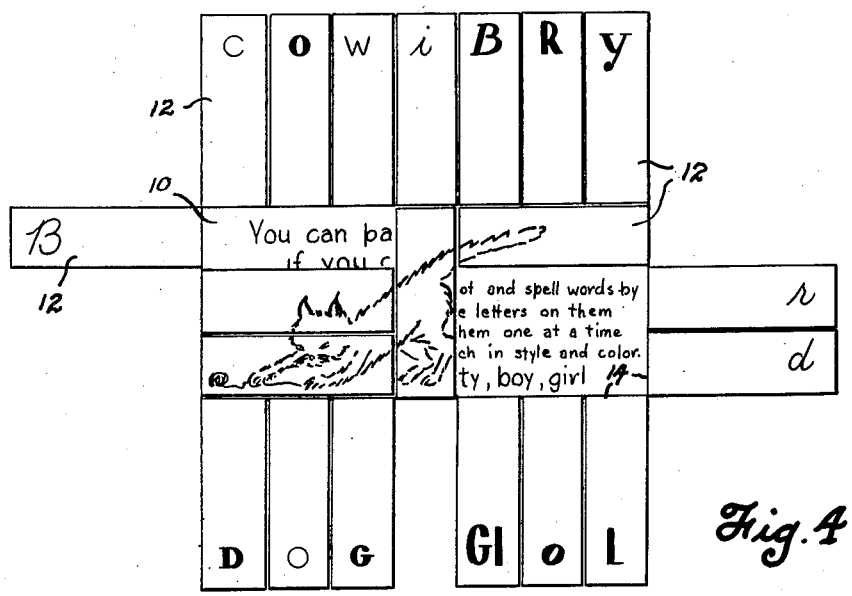
Figure 4 is a plan view similar to Figure 3 but showing a different set of tabs folded over so as to form a picture.

Figure 3 shows the tabs bearing the light weight letters "C," "O" and "W" turned down so as to form a picture of a "cow," whereas Figure 4 shows the letters "K," "i," "t" and "ty" turned down so as to form a picture of a "Kitty."

It will be noted that some of the tabs have more than one letter placed thereon. Thus, the one tab used in spelling "Girl" has the two letters "GI" appearing thereon. By virtue of this arrangement, it is possible to use only three tabs in forming a picture of a "Girl," even though the word "Girl" has more than three letters. The number of tabs used in forming a picture may be varied. Thus, the four tabs bearing the indicia "K," "i," "t" and "ty" are used in forming a picture of a "Kitty."

For purposes of illustration, the segments 12 in Figures 1 through 4 have been shown as spaced slightly from one another, whereas in actual practice they would normally touch one another. The shape and size of the device may be varied considerably without departing from the spirit of my invention. Likewise, the pictures or objects formed by folding down the segments may be varied. Thus, a picture of a "hat," for example, could be substituted for the picture of the "cow" shown in Figure 3, in which case the letters C-O-W appearing on the front of the tabs would be replaced by the letters H-A-T.

The device may also be used in reverse, in which case one would piece pictures together and find the spelling of the animal or object on the reverse side of the segments on which the picture appears.

Figure 5:
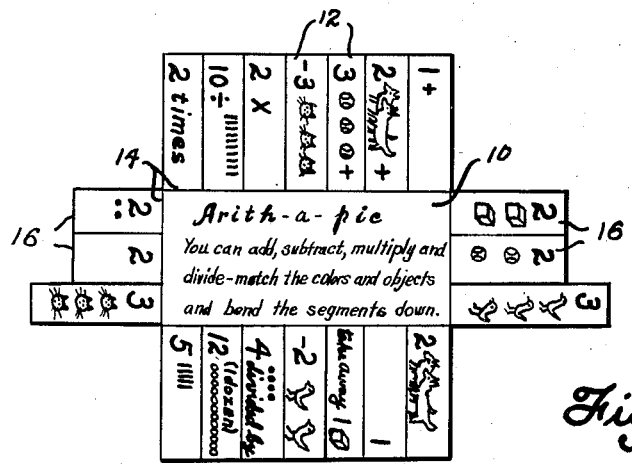
Figure 5 is a plan view on a reduced scale showing another embodiment of the educational device which is adapted for use in teaching arithmetic.
Figure 6:
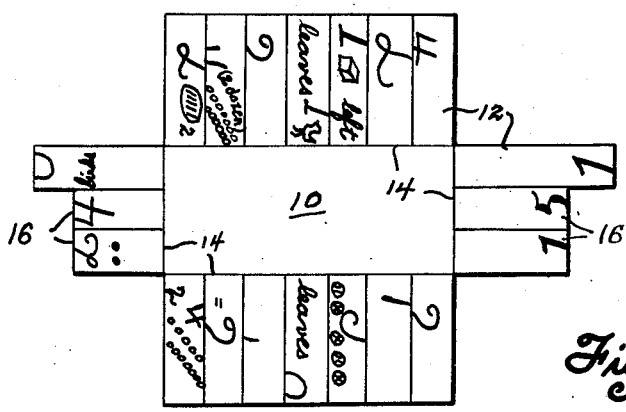
Figure 6 is a plan view showing the reverse side of the device shown in Figure 5.
Figure 7:
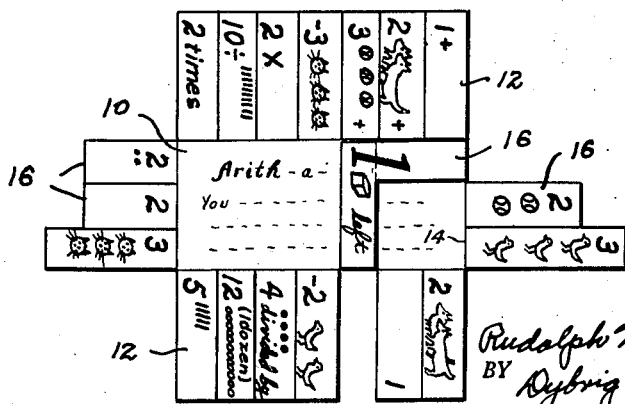
Figure 7 is a plan view similar to Figure 5 but showing certain of the segments folded over onto the main support.

In Figures 5, 6 and 7 of the drawings, there is shown another embodiment of my invention which may be used in teaching arithmetic. In this form of my invention, various mathematical problems are depicted by the numerals and other indicia printed on the normally exposed sides of the segments 12 and the answers to the problems are formed by turning down the segments on which the numbers and associated pictures forming the problem are shown. Figure 7 illustrates what shows up when the segments on which the problem "2 blocks" "take away 1 block" appears are folded over onto the center support 10.

It will be noted that the segments designated by the reference numeral 16 in Figures 5, 6 and 7 are shorter than the rest of the segments but that the principle of operation remains essentially the same.

The structural arrangement, except for the symbols, pictures, et cetera, may be the same for all of the devices, if desired. It is contemplated that the devices will be sold both individually and in sets. Thus, the device shown in Figures 1 through 4 may form a part of a set including the device shown in Figures 5 through 7 as well as similar devices having still different pictures and symbols.

Each of the segments 12 and 16 would be suitably scored along the line of its contact with the main panel 10, such as at 14, so as to facilitate bending the segments over onto the panel 10 during the formation of the pictures or other objects. In the event that it is desired to use heavy cardboard or the like for the main panel 10, suitable hinges may be used for attaching the segments 12 to the main support.

Instructions for the use of the device may be printed on the main support or center panel 10, as indicated, or the instructions may be printed on a separate sheet or on the envelope or box (not shown) in which one or more of the devices would be packaged.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. An educational device comprising a rectangular support, a plurality of groups of complementary segments pivoted to each of the sides of said support and each group of complementary segments carrying upon one face indicia setting forth a mathematical problem and on the other face indicia setting forth the solution to said problem, the segments being so arranged relative to one another that when all of the complementary segments of one of said groups have been folded over onto said support, the answer to the mathematical problem represented thereby will appear in a composite manner.

2. In an educational device, the combination with a rectangular support, of a series of segments on each side of said support, means for supporting said segments for movement relative to said support, each of said segments having one portion thereof normally hidden from view and having another portion thereof normally visible, said normally hidden portion of each of said segments having fragmentary subject matter thereon which is complementary to fragmentary subject matter on at least one of the other segments, said normally visible portion of each of said segments having indicia thereon for aiding in selecting segments having complementary fragmentary subject matter thereon on the normally hidden portion thereof, whereby upon movement of selected segments relative to said support, the normally hidden fragmentary subject matter will be exposed to view with said fragmentary subject matter properly arranged so as to present a composite subject.

3. A device for teaching spelling comprising a rectangular support, a plurality of groups of complementary segments pivoted to each of the sides of said support and each group of complementary segments carrying upon one face letters of the alphabet for spelling the name of an object and on the other face a picture of the object spelled on the reverse side thereof, the segments being so arranged relative to one another that when all of the complementary segments of one of said groups have been folded over onto said support, the picture of the object represented thereby will appear in a composite manner.

RUDOLPH H. DIRCKX.

REFERENCES CITED

The following references are of record in the file of this patent:

UNITED STATES PATENTS

| Number | Name | Date |
|---|---|---|
| 698,603 | Wiederseim, Jr. | Apr. 29, 1902 |
| 1,304,773 | Howell | May 27, 1919 |
| 1,359,115 | Sittinger | Nov. 16, 1920 |
| 1,701,557 | Clinch et al. | Feb. 12, 1929 |